United States Patent
Hopgood et al.

(10) Patent No.: US 8,949,497 B2
(45) Date of Patent: Feb. 3, 2015

(54) METHOD AND APPARATUS FOR INTERLEAVING BURSTS OF HIGH-SPEED SERIAL INTERCONNECT LINK TRAINING WITH BUS DATA TRANSACTIONS

(75) Inventors: Michael Hopgood, San Jose, CA (US); Wei-Je Huang, Fremont, CA (US); Mark Taylor, Mountain View, CA (US); Hitendra Dutt, Sunnyvale, CA (US); David Wyatt, San Jose, CA (US); Vishal Mehta, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 500 days.

(21) Appl. No.: 13/230,694

(22) Filed: Sep. 12, 2011

(65) Prior Publication Data

US 2013/0067127 A1  Mar. 14, 2013

(51) Int. Cl.
G06F 13/00 (2006.01)
G06F 3/00 (2006.01)

(52) U.S. Cl.
CPC .................................... *G06F 13/00* (2013.01)
USPC ........................................................ 710/104

(58) Field of Classification Search
CPC .. G06F 13/4072; G06F 9/4411; G06F 13/385
USPC ................................................ 710/8, 60, 104
See application file for complete search history.

(56) References Cited

U.S. PATENT DOCUMENTS

| | | | |
|---|---|---|---|
| 4,621,366 A | 11/1986 | Cain et al. | |
| 7,136,953 B1 * | 11/2006 | Bisson et al. | 710/307 |
| 7,461,195 B1 * | 12/2008 | Woodral | 710/313 |
| 7,539,809 B2 * | 5/2009 | Juenger | 710/307 |
| 7,715,323 B2 * | 5/2010 | Connolly et al. | 370/252 |
| 7,757,020 B2 * | 7/2010 | Sharma et al. | 710/60 |
| 7,853,731 B1 | 12/2010 | Zeng | |
| 7,996,591 B2 * | 8/2011 | Xie et al. | 710/104 |
| 8,059,673 B2 * | 11/2011 | Kobayashi | 370/431 |
| 8,275,922 B2 * | 9/2012 | Barrett et al. | 710/106 |
| 8,301,813 B2 * | 10/2012 | Barbiero et al. | 710/104 |
| 8,483,108 B2 * | 7/2013 | Whitby-Strevens | 370/292 |
| 8,503,474 B2 * | 8/2013 | Diab et al. | 370/458 |
| 8,599,913 B1 * | 12/2013 | Brown et al. | 375/232 |
| 2003/0189977 A1 * | 10/2003 | Sweitzer et al. | 375/222 |
| 2004/0213361 A1 | 10/2004 | Chen et al. | |
| 2005/0251595 A1 | 11/2005 | Lesartre | |
| 2012/0047260 A1 * | 2/2012 | Patel | 709/225 |
| 2013/0051483 A1 * | 2/2013 | Wyatt et al. | 375/259 |

OTHER PUBLICATIONS

PCI SIG Debugging PCI Express 3.0 Link Problems—Dated Jun. 22 2011; 50 Pages.*

* cited by examiner

Primary Examiner — Brian Misiura

(57) ABSTRACT

In an apparatus according to one embodiment of the present disclosure, a communications link comprises a first device and a second device communicating with each other via the communications link at a plurality of different speeds. However, prior to communicating via the communications link for the first time at a second speed, the first device and second device complete a first training cycle at the second speed. Further, during this first training cycle for the second speed, the first training cycle for the second speed will pause before the first training cycle at the second speed completes, and the first device and second device communicate at a first speed for a period of time before returning to the paused first training cycle at the second speed. When the paused first training cycle for the second speed continues, the first training cycle for the second speed will continue where it had paused.

20 Claims, 7 Drawing Sheets

METHOD AND APPARATUS FOR INTERLEAVING BURSTS OF HIGH-SPEED SERIAL INTERCONNECT LINK TRAINING WITH BUS DATA TRANSACTIONS

CROSS-REFERENCES TO RELATED APPLICATIONS

This Application is related to co-pending U.S. patent application Ser. No. 13/217,057, filed Aug. 24, 2011.

TECHNICAL FIELD

The present disclosure relates generally to the field of high-speed serial interconnect links and more specifically to the field of communications link equalization training

BACKGROUND

Peripheral Component Interconnect Express (PCIe) is a high-speed serial interconnect bus standard, as established by the PCI SIG (PCI Special Interest Group). The PCIe bus can be used in computer hardware as a motherboard-level interconnect or as an expansion card interface. A motherboard-level interconnect links together motherboard mounted peripherals, while an expansion card interface is used by peripherals (e.g., a video card) that fit into the motherboard's expansion slots. In one embodiment, as illustrated in FIG. 1, an upstream port or rootport 102 is connected to a downstream port or endpoint 104.

PCIe Generation 3.0 (PCIe Gen3) is the latest PCIe standard with increased interconnect link speeds, but with accompanying increased link equalization training time requirements. PCIe link equalization training is the process whereby a connected rootport 102 and endpoint 104 select parameters that ensure a favorable bus bit error rate (BER) when transmitting and receiving traffic over the PCIe interconnect link at higher speeds. The challenge with existing PCIe link equalization training processes is that under normal circumstances such equalization training can be very lengthy (e.g. 100 ms). During such a training interval, the bus being unavailable, data will not be transmitted across the bus. Attempts to send data during such link equalization training times will either fail with a completion timeout (e.g. returning OxFF's) or be held-off within the sending PCIe device 102, 104 until the training is complete.

In many system designs a peripheral or mezzanine bus may be a critical component for system operation, hence a long period of unavailability may compromise operating system robustness, or result in the loss of data. For example, a common rule of thumb for system BIOS code inside a System Management Mode (SMM) handler is never to exceed 0.5 ms delay, however if such code was to access a PCIe device during a retraining (re-equalization) and thus be held up for 0.5 ms or longer, the operating system software would trigger an error message, or lock-up, or can lead to data corruption or a system crash.

One solution is to attempt to constrain equalization training sequences to system boot times (e.g. before the operating system loads). However, should the original link be lost and a new link established with new parameters required, an equalization training sequence or training arc will be required to be performed outside of the initial boot sequence. As discussed in detail below, equalization training may be desired or required when electrical characteristics of a PCIe Gen3 link change during run-time and a link that was previously working has degraded to the point where data loss is not recoverable, or when the bit error rate (BER) exceeds a tolerable threshold. Such out of initial boot sequence equalization retraining can result in problems for devices connected to the effected PCIe link that are sensitive to the quantity of downtime required for equalization training or retraining. While PCIe device receivers may be designed to tolerate some dynamic changes in characteristics, and self-adapt (e.g. PLL drift, time eye skew) to deal with small variations around the operating point, if the initial alignment was only marginal or a large shift in electrical characteristics occurs (e.g., due to thermal shock or contamination of the electrical connection) then the BER may be severe enough that there may be no option but to drop speed to a lower speed (e.g. PCIe Gen1/Gen2 speeds) or retrain the PCIe link at the higher speed outside of the initial boot sequence.

SUMMARY OF THE INVENTION

This present invention provides a solution to the challenges inherent in equalization training for PCIe links when the equalization training occurs outside of the initial boot sequence. Embodiments of the invention break down the training into smaller intervals of partial training, interspersed with data transactions that helps address the implicit risks of training, as well as allowing data to continue to flow, while the optimal link speed is achieved. The overall process takes longer than originally occurred with full link training, however, because training bursts can be interleaved with bus idle conditions, and normal data transactions can still be completed, the process is not critically intrusive to normal system operation.

In an apparatus according to one embodiment of the present invention, a communications link comprises a first device and a second device. The first device and the second device communicate with each other via the communications link at a plurality of speeds. However, prior to communicating via the communications link for the first time at a second speed, the first device and second device complete a first training cycle for the second speed. Further, during this first training cycle for the second speed, the first training cycle for the second speed will pause before the first training cycle for the second speed completes and return to a first speed that had been previously trained, such that the first device and second device are able to communicate at the first speed for a period of time before returning to the paused first training cycle for the second speed. When the paused first training cycle for the second speed continues, the first training cycle for the second speed will continue where it had paused. Such interleaving of equalization training with lower speed data transactions ensures that while full link training is underway, critical data traffic may still be processed.

In a method according to one embodiment of the present invention, a method for communications link training is disclosed. A communications link training cycle comprises: requesting a speed change to a second speed for a first device communicating with a second device at a first speed via the communications link, and performing a first training cycle for the first device and the second device at the second speed. The training cycle is paused before the training cycle completes. After pausing the training cycle, data is communicated between the first device and the second device at the first speed for a period of time. The first training cycle for the first device and the second device at the second speed is continued, wherein the first training cycle at the second speed continues at a point where the first training cycle paused. Such interleaving of equalization training with lower speed data transactions ensures that while full link training is underway, critical data traffic may still be processed.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
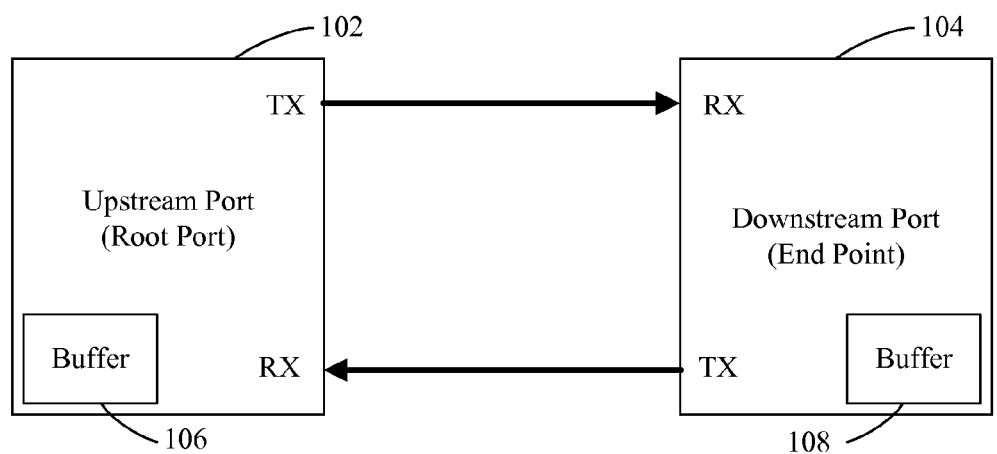
FIG. 1 illustrates a simplified schematic diagram of two devices interconnected by a PCIe link according to the prior art.

Reference will now be made in detail to the preferred embodiments of the present disclosure, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Communications Link Equalization Training

This present disclosure provides a solution to the increasing challenges inherent in dealing with the time required for equalization training of PCIe links when such equalization training occurs outside of the initial boot sequence. Various embodiments of the present disclosure provide processes and apparatus for burst link training Burst link training is a process where the lengthy process of equalization training is split up into multiple training cycles called burst link training "quanta." Splitting up the traditional Recovery Equalization (equalization training) into a series of individual steps avoids completion timeouts during equalization training by reducing PCIe link down time to upper software layers. These individual burst link training quanta can be interspersed with data transactions; such that equalization training (which takes place at the higher speed, e.g. PCI Gen3 speeds) can be interleaved with data transactions that are completed at a lower speed that has already completed equalization training, such as PCI Gen1/Gen2.

While the overall process may take longer than conventional full PCIe link training (e.g. autonomous equalization training), because the link training bursts can be interleaved with data transactions at the lower speeds, the equalization training for the higher speed (e.g. PCI Gen3) will not be intrusive to normal system operation. As discussed below, such burst link training can allow the achievement of adaptive optimal system performance through repeated, periodic equalization of link characteristics for optimal performance. Such burst link training can be applied repeatedly as needed to periodically adapt to environmental influences on PCIe link characteristics. As discussed below, in one embodiment, the process of retraining is performed so long as the bit error rate or another PCI link quality indicator is above a selected threshold, with the process stopping once the PCIe link quality is better than another selected threshold.

Recovery equalization (equalization training) can be initiated when a bit error rate (BER) becomes too high for reliable transmission of traffic over the PCIe bus at high speeds (e.g. PCIe Gen3), or when the PCIe link has been in a low-speed mode and a first request for transition to a higher speed (e.g. Gen3) is made. PCIe device software recognizes the request to enter high-speed PCIe link operation, however, as described in detail below, a Link Training and Status State Machine (LTSSM), which manages the PCIe equalization training, also recognizes that the PCIe link has not been trained for the higher speed. In a copending patent application Ser. No. 13/217,057, titled "SYSTEM AND METHOD FOR DETECTING RESUSE OF AN EXISTING KNOWN HIGH-SPEED SERIAL INTERCONNECT LINK," by Wyatt, et al., a method is set out to reuse known PCIe link training parameters to reduce or remove long training times required for equalization training by reusing the last known PCIe link training parameters. However, such a process as discussed by Wyatt only works when the previously used equalization parameters are known to be good. If the PCIe link has not yet been trained at the higher speed (e.g. PCIe Gen3), or if electrical characteristics of the link have degraded (e.g., as a result of thermals, poor electrical connections, system contamination from dirt or dust . . . etc.) to the point where the PCIe bus data error rate becomes unacceptable, then equalization re-training is required if PCIe Gen3 speed is to be maintained. Therefore, as discussed below, to avoid or minimize the risk of system delays, burst link training may be utilized which interleaves high speed equalization training with lower speed data traffic handling.

Figure 2A:
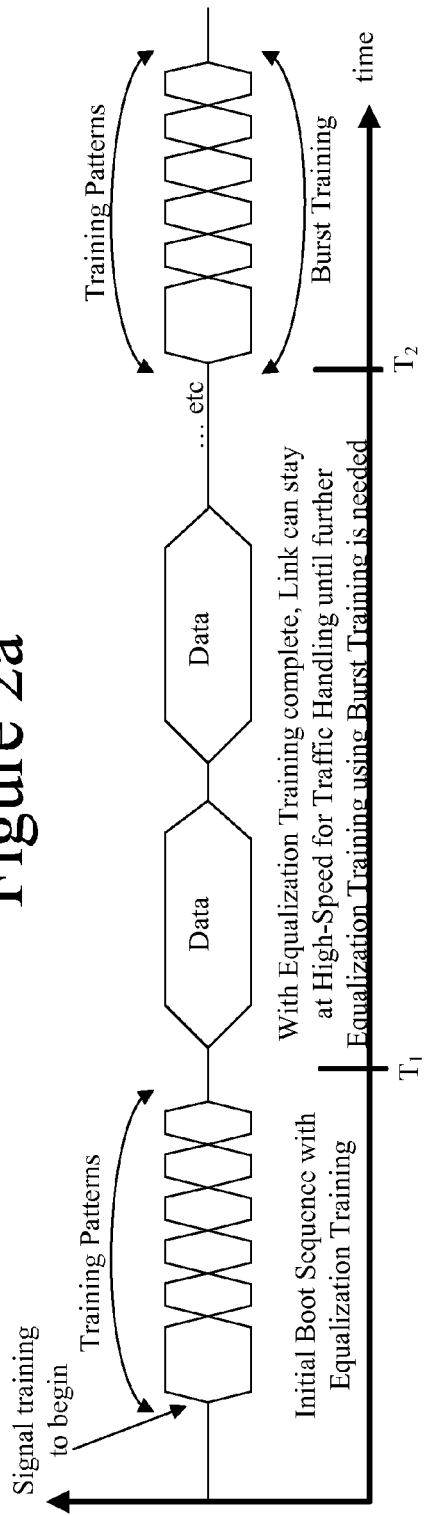
FIG. 2a illustrates an exemplary flow-chart for performing equalization training of two interconnected devices on a PCIe link in accordance with an embodiment of the present invention.

As illustrated in FIG. 2a, the first equalization training for PCIe link ports 102, 104 usually occurs during an initial boot sequence when the computer system is first powered on. During this initial boot sequence, the computer system will not be affected when the PCIe link is idle during the equalization training During this initial boot sequence, as illustrated in FIG. 2a, there is at least one inactivity timer that establishes when the system (e.g. a rootport device) can communicate with an endpoint device. In one exemplary embodiment, $T_1$ is at least 100 ms. Equalization training (including equalization training at PCIe Gen3 speeds) can usually be completed before the inactivity timer finishes at $T_1$. However, for an exemplary computer system with a more complicated or longer link runs, equalization training may not complete during the initial boot sequence inactivity time T1. There may also be reasons why PCIe Gen3 equalization training is not performed during the first or initial boot of the system, or as further illustrated in FIG. 2a, why the PCIe Gen3 equalization training may need to be repeated at a later time $T_2$. As noted above, PCIe Gen1/Gen2 equalization training can be completed rapidly enough that there is little down-time and the rootport 102 and endpoint 104 device buffers 106, 108 are normally sufficient to prevent the system or user from noticing the time that the PCIe link was idle for training at PCIe Gen1/Gen2 speeds.

As noted above, computer systems generally only boot once during a particular operating period before powering down, and require a new boot sequence the next time the system is started. However, there are computer systems that do not follow the single boot concept. The computer system may perform an initial boot (with the PCIe link entering Gen 3 after the required equalization training) and then due to power management controls, a graphics processing unit (GPU) can be powered down and then as illustrated in FIG. 2a, subsequently restarted with the required equalization training cycle. In other words, while the rest of the computer system may still be powered up, the PCIe linked device, such as a GPU, can be powered down alone. Powering down the GPU will terminate the PCIe link to the GPU, which will have to be re-established once the GPU is powered back up.

Figure 2B:
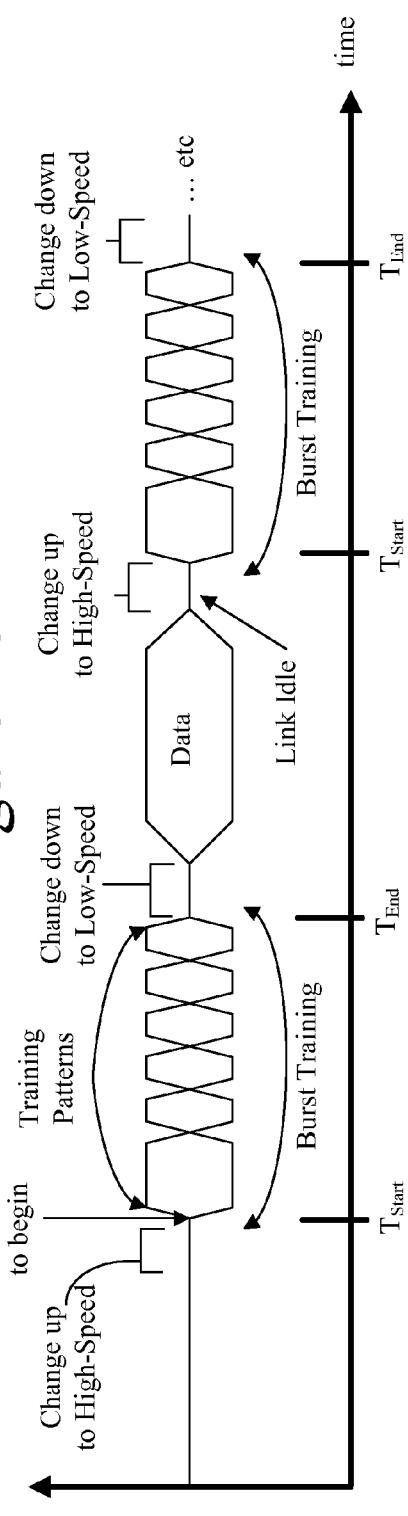
FIG. 2b illustrates an exemplary flow-chart for performing equalization training of two interconnected devices on a PCIe link in accordance with an embodiment of the present invention.

This second equalization training, as illustrated in FIGS. 2a and 2b, will be performed outside the system boot sequence when the PCIe link is re-established. As discussed below, FIG. 2b illustrates an exemplary process for burst link training that allows equalization training to be interleaved with lower speed data transactions, such that the desired PCIe link equalization training at the desired speed (e.g. PCIe Gen3) can be periodically performed for a predetermined period of time ($T_{start}$-$T_{End}$, as illustrated in FIG. 2b) followed by the PCIe link transitioning back to a lower speed to allow queued traffic (e.g. data transactions) in the ports' 102, 104 buffers 106, 108 to be transmitted and received.

The GPU can be periodically powered down through aggressive power management. For example, should there be a particular system environment where the GPU is not needed, the GPU can be powered down. In other words, the GPU can be idled back or shut completely down, allowing the PCIe link to be terminated. Therefore, shutting down the GPU can be done in stages: from completely powering the GPU down to only idling certain processing functions. As power management will likely remain a design consideration, other opportunities to further conserve power in the future may be desired or required.

In one embodiment, the equalization training is initiated while the PCIe link is idle, however, various embodiments may not wait for idleness, and may simply perform training for the minimum time possible, assuming the PCIe link training is more important than PCIe link throughput. Other embodiments may use varying degrees of PCIe link idleness conditions to imitate the training burst sequence.

Burst Link Training

Both upstream (rootport) 102 and downstream (endpoint) 104 ports, as illustrated in FIG. 1, must have additional capability bits to make the required assessments described below. Such additional condition bits and saved data are saved in registers on each of the rootport 102 and endpoint 104 devices. Such additional bits are used by the devices 102, 104 to determine if the devices they are each teamed with on the PCIe link are capable of Burst Link Training. In exemplary embodiments, that there will be no impact to systems that do not support Burst Link Training. In one embodiment, Burst Link Training will need participation from software to be executed successfully. While the first Burst Link Training session may occur autonomously via the initial system BIOS boot, as illustrated in FIG. 2a, successive Burst Link Training sessions to improve equalization parameters, as illustrated in FIG. 2b, will require initiation by system software to avoid intolerable PCIe link down-times. As discussed below, the set(s) of equalization parameters used, or the parametric area covered, in the training process, as well as training State Machine state, are preserved in temporary on-chip storage so as to allow the next training burst to continue from where the last one left off. Subsequent training bursts can re-continue where each one left off, sequentially walking the possible equalization space, to resolve the optimal parameters, e.g., without restarting at the origin each time.

A Burst Training Quantum is a small window of time in which the PCIe link enters Recovery Equalization (where equalization training can be performed) to evaluate a few coefficients, followed by a quick exit to a lower PCIe Generation, such as PCIe Gen1 or Gen2. It is not expected that the optimal set of coefficients will be found inside a single burst quanta. Rather, in one embodiment, the optimal set of coefficients will be found through a series of burst training quanta. In other words, Burst Training Quanta allow the PCIe link to find an optimal set of transmitter coefficients for each port 102, 104 over time. Note that as illustrated in FIG. 2*b*, each quantum in burst training is a link down event where no data traffic will be processed. The burst quanta are separated by link up periods which allow data transactions to take place at a lower speed that has already completed equalization training.

Each of the exemplary rootport 102 and endpoint 104 devices contain configuration registers that hold condition bits to support Burst Link Training, as illustrated in Table 1. As illustrated in Table 1, embodiments of the invention can make use of the following flags, bits, and values: burst training supported bit, burst training enable bit, burst training time limit value, burst training quantum successful bit, and burst training complete bit.

TABLE 1

| | |
|---|---|
| Burst Training Supported bit: | A Read-Only Config capability bit that indicates a device's capability to perform Burst Link Training (BLT). BLT capability includes the ability to restrict timing in phases, recall previous settings, and properly control status bits as specified. |
| Burst Training Enable bit: | A Read-Write Config bit that enables this feature for a particular PCIe device. |
| Burst Training Time Limit value: | A Read-Write Config value that can be set by system software to configure the length of bit that each Burst Link Training Quantum is expected to last. It is expected that this value will be lower than the shortest timeout that the upper software layers are configured to support. |
| Burst Training Quantum Successful bit: | A Read-Only Config bit that indicates that a Burst Training Quantum completed normally and within the time specified in the Burst Training Time Limit. |
| Burst Training Complete bit: | A Read-Only Config bit that indicates that all the Burst Training Quanta that constitutes a Burst Training have completed. This means that the port has successfully completed its search for the optimal set of coefficients to request from the other port. |

In one exemplary embodiment, system software (BIOS or software drivers) programs the Burst Training Time Limit register to a reasonable and safe value that prevents completion timeouts from occurring during a Burst Link Training Quantum. It is necessary that the same value be programmed on both of the ports that constitute the PCIe link. As illustrated in FIG. 2*b*, the burst training time limit stored is that time $T_{start}$-$T_{End}$. In another embodiment, the Burst Training Enable bit is also set on both ports so that the equalization training state exits in the time specified in the Burst Training Time Limit register.

Following the end of a Conventional Reset, in one embodiment, the downstream endpoint port 104 will check to see if the upstream rootport 102 is able to support Burst Link Training by examining the Burst Link Training Supported bit in the received TS1s (training sets received by each port and discussed below). If the upstream rootport 102 is capable of performing Burst Link Training, then the downstream endpoint port 104 may choose either between the full equalization training procedure, or the Burst Link Training procedure, depending on the current system requirements. If the upstream rootport 102 does not advertise Burst Link Training Supported in its TS1s, then the downstream endpoint port 104 will perform the autonomous full training procedure as outlined in standard PCIe Gen3 specifications.

Prior to the very first quantum of the PCIe Gen3 speed change request, in one exemplary embodiment, the downstream endpoint port 104 communicates suggested presets via training sets in received configuration data to the upstream rootport 102. These presets can be applied to the transmitters during phase 2 and phase 3 of the first Burst Link Training Quantum as discussed below. The Burst Link Training Quantum Successful bit and the Burst Training Complete bit are set to 0 when a speed change to PCIe Gen3 is requested via training sets when in PCIe Gen1 or Gen2.

A port 102, 104 that supports Burst Link Training, in one exemplary embodiment, has internal registers to cache the last set of coefficients requested during each quantum. These settings in the above embodiment will then be loaded at the beginning of the next quantum. This allows the next burst training quantum to continue searching from where the previous quantum left off.

In one exemplary embodiment, if the PCIe link has not yet found the optimal set of coefficients for normal operation at PCIe Gen3, the PCIe link will need to operate in PCIe Gen1 or PCIe Gen2 speeds until the optimal coefficients have been found (by requesting more Burst Link Training Quanta). Each burst training quantum, in these exemplary embodiments, can be initiated by a directed speed change to PCIe Gen3 speed from either the upstream endpoint port 104 or the downstream rootport 102, followed by an entry back into equalization training.

An exemplary Burst Link Training Quantum is conducted just like a regular Recovery Equalization training cycle, with the exception that the total time spent in equalization training is restricted to the timeout value specified in the Burst Training Time Limit register. As discussed below, exemplary ports on both sides of the PCIe link will transition through phases 0, 1, 2, and 3, in that order, and immediately take the normal exit arc when the timeout occurs. For example, in an exemplary embodiment, if the time is set to 2 ms, and phases 0, 1, and 2 take 1.5 ms to complete, then phase 3 will only run for 0.5 ms. If however, phases 0, 1, and 2 consume the entire 2 ms, then phase 3 will immediately exit via the normal exit arc. After the upstream rootport 102 has finished searching for the optimal set of coefficients for the downstream endpoint port 104, it will immediately exit phase 2 on successive Burst Link Training Quanta so that the downstream endpoint 104 can find its own optimal coefficients in phase 3 in future Burst Link Training Quanta. Note: if a port 102, 104 finds that it has not exceeded the timeout yet, but does not have enough time left to request and evaluate another set of coefficients in the current Burst Link Training Quanta, the port 102, 104 may exit the current phase early.

In one exemplary embodiment, upon exiting a Burst Link Training Quantum, the port 102, 104 sets its Phase 2 successful bit to 0b if further searching is needed in phase 2, and sets the Burst Link Training Quantum to 1b if no further searching is needed in Phase 2. Similarly, the Phase 3 Successful bit is set to 1b after the port responsible for searching in phase 3 has decided that no more searching is needed in phase 3. Further, the port that has completed its search sets the Burst Training Complete bit to 1b in its transmitted training sets to communicate this information to the other port.

On exiting a Burst Link Training Quantum normally, the port will set its Burst Link Training Quantum Successful bit in a Link Status register. However, if there was a timeout that causes the Link Training and Status State Machine (LTSSM) to lower speed (e.g. PCIe Gen1/Gen2) and the burst link training quantum was not successfully completed, the Burst Link Training Quantum Successful bit will remain at 0.

At the completion of a Burst Link Training Quantum, if either port has not been able to find the optimal set of coefficients for the other port, it shall set its Burst Training Complete bit to 0b in its training sets so that the other port will be notified that training has not yet completed. This information can be useful to the other port to decide whether additional Burst Training Quanta need to be scheduled. In one embodiment, the port that requires more Burst Training quanta, after the current quantum has completed, requests the link speed to be changed back to the previous working speed (such as PCIe Gen1 or Gen2). If the port has found the optimal set of coefficients in the current Burst Link Training quantum, it shall set the Burst Training Complete bit to 1b in the Link Status registers so that the upper software layers can know that the burst training process has completed for that port. In addition, the port will transition to the L0 state at PCIe Gen 3 instead of automatically requesting a speed change back to lower speeds.

Figure 3:
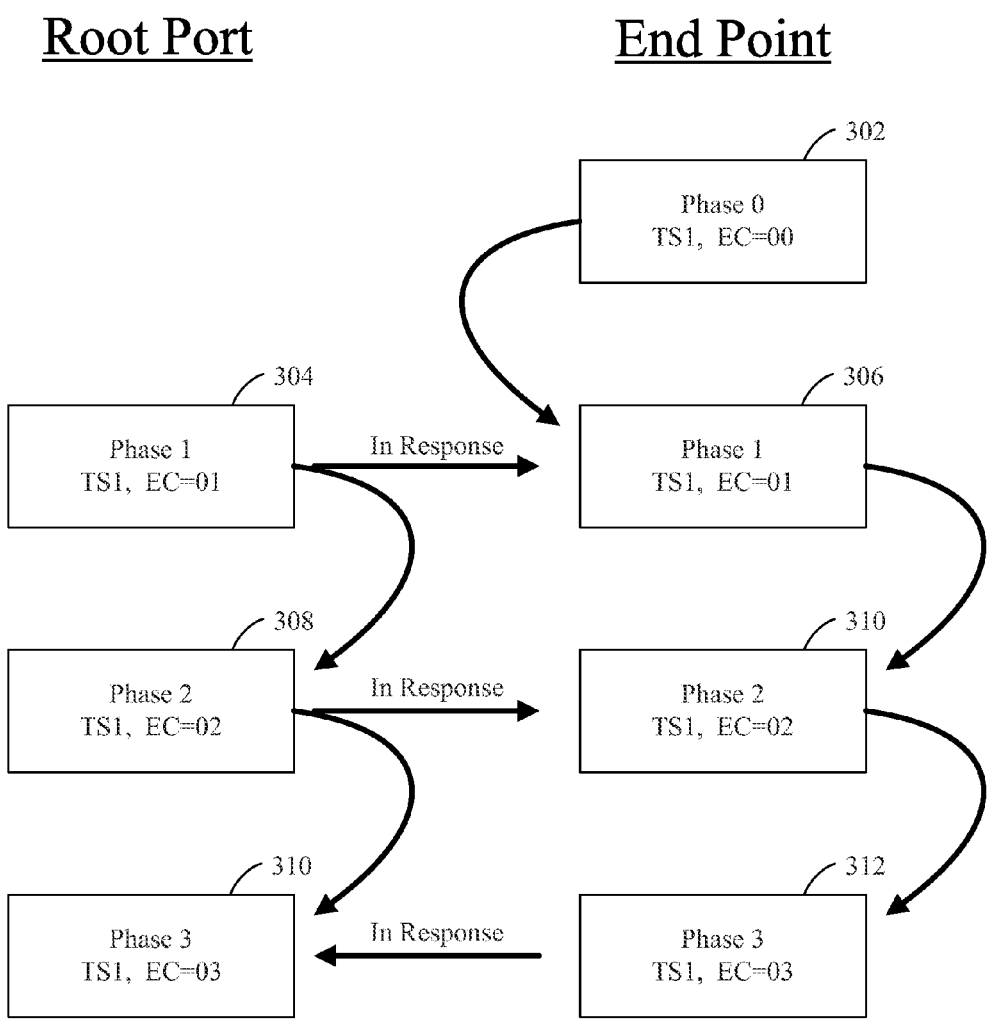
FIG. 3 illustrates an exemplary flow-chart for performing equalization training of two interconnected devices on a PCIe link in accordance with an embodiment of the present invention.

Equalization Training Phases:

FIG. 3 illustrates the exemplary phases of equalization training as performed by the rootport 102 transmitter (TX) and receiver (RX) and an endpoint 104 transmitter (TX) and receiver (RX) illustrated in FIG. 1. These equalization training phases are used whether the equalization training is a full autonomous equalization training cycle, or Burst Link Training. As discussed above and below, in the phases of equalization training, the optimum combination of parameters are determined that result in the highest transmission quality (e.g. an acceptable BER). Such equalization training is required to transmit and receive traffic in PCIe Gen1, as well as when transitioning from PCIe Gen1 to PCIe Gen2 and even more so when transitioning to PCIe Gen3. As discussed below, while the equalization training for PCIe Gen1 or Gen2 can be completed quickly and unnoticed by the system, transitioning to the higher communication speeds provided by PCIe Gen 3 requires an equalization training arc that can become quite time intensive.

In one exemplary embodiment, equalization training is divided into four basic stages or phases. Before PCIe Gen3 speeds are entered, the ports 102, 104 exchange basic information at Gen1 or Gen2 speeds to tell the rootport 102 and endpoint 104 what the recommended starting points for PCIe Gen3 would be. The rootport 102 sends a training set to the endpoint 104 device and within the training set is a selection of a particular set of presets (standard, identified, collection of transmitter parameters). There are several parameters: precursor, maincursor, and postcursor. Further, in one embodiment, there are 11 basic combinations of parameters available.

However, these pre-selected settings may not be ideal. Further, because of the large range of devices that are possible, while one selection of settings may be optimal for one particular pair of devices, they will be wrong for another pair of devices (even if they should be the same type of devices made by the same manufacturer(s)). In one embodiment, further parameter combinations can be selected, apart from the preset selections that will be more optimal than the preset selection of parameters. There may also be situations where Burst Link Training can be improved upon by using a custom arrangement for a particular set of port devices, such that starting settings are designed to be closer to an optimal set right from the start, rather than starting from generic parameters. Being able to start with a set of parameters that are "pretty good" for a given pair of devices means that the equalization training time may be reduced, allowing for faster Burst Link Training to take place.

As illustrated in FIG. 3, four different phases are performed during equalization training: 0, 1, 2, and 3. During each of these Phases, training sets (TS1s) are sent. Inside each of the training sets are identifying characteristics to define what phase each device is running at. To begin equalization training, as illustrated in FIG. 3, block 302, the rootport 102 enters Phase 1 (EC=01). The training set (TS1) for the rootport 102 indicates that it is now in training Phase 1. The rootport 102 enters directly into this Phase and sets its TS1 to Phase 1 to show the endpoint 104 that it is entering Phase 1.

Meanwhile, as illustrated in block 304, the endpoint 104 starts out by entering Phase 0 (EC=00). A purpose of Phase 0 is to make sure that the two devices 102, 104 can synchronize with each other before they start training. This ensures that both devices 102, 104 are at the same time in training before training continues. Once the endpoint 104 detects that the rootport 102 is in Phase 1 and is sending data that it can partially see, the endpoint 104, as illustrated in block 306, will also enter Phase 1 (EC=01). Because there has not been any training yet, the received data during Phases 0 and 1 won't be completely clean (in other words, a receiver will receive only some of the data, with a lot of the data lost) until the equalization training finishes. While received data isn't clean enough for transmitting traffic, it can be sufficient to allow the equalization training to be performed. Once both the rootport 102 and the endpoint 104 are in Phase 1 (EC=01), the equalization training will have entered Phase 1 of the training sequence (that is, both devices are synchronized at Phase 1). It can be known that both ports are at Phase 1 when the endpoint 104 is at Phase 1 because the endpoint 104 will not enter Phase 1 until the rootport 102 has announced to the endpoint 104 that it is in Phase 1.

As illustrated in blocks 308 and 310, now that both devices 102, 104 are in Phase 1, the endpoint 104 and the rootport 102 will now transition to Phase 2 (EC=02 for both ports). At this time the endpoint 104 device has taken control of the PCIe link and attempts to evaluate the data coming back to it. In an exemplary embodiment, during Phase 2, the equalization training cycle is training the rootport 102 transmitter to the endpoint 104 receiver. The endpoint 102 transmitter is used to instruct the rootport 102 transmitter what parameter settings to select. As discussed above, in setting up the parameters, either a series of presets can be selected, or detailed parameters can be individually selected. The detailed parameters allow for finer adjustments, although, the first parameters selected may be presets. After receiving the desired parameters from the endpoint 104 (as contained in the training set), the rootport's 102 transmitted signal is evaluated by the endpoint 104. If the endpoint 104 determines that the quality of the received signal does not meet a metric, different parameter settings can be selected through the endpoint 104 training set that is transmitted to the rootport 102 to select different parameter settings. In other words, the root port 102 transmitter sends data to the endpoint 104 receiver and the end point 104 evaluates the quality of the signal and if the quality is not sufficient, the end point 104 transmitter requests different parameter settings by transmitting the request to the root point 102 receiver, wherein the root port 102 changes settings and transmits again to the endpoint 104. This circular process continues until the receiver determines that the data received is acceptable (that it meets the established metrics). Once the endpoint determines that the received data quality meets prescribed metrics, Phase 2 finishes.

In blocks 310 and 312 of FIG. 3, the equalization training cycle has progressed to Phase 3 (EC=03 for both ports) and is now training the endpoint 104 transmitter to the rootport 102 receiver. In Phase 3 the endpoint 104 transmitter sends data to the rootport 102 receiver, and the rootport 102 evaluates the quality of the transmitted signal. If the quality of the received signal is not sufficient, the rootport 102 transmitter requests different settings by transmitting the request to the endpoint 104 receiver. The endpoint 104 transmitter changes parameter setting as requested by the rootport 102 and transmits again to the rootport 102 receiver for further analysis.

In Phases 2 and 3 of an exemplary embodiment, contained within the transmitted data, the transmitting device can acknowledge whether or not it was able to accept those requested setting changes. If parameter changes are requested that a device cannot handle, the requested device will respond and signify that the requested device can't change to the desired settings. Otherwise, the requested device will respond that it was able to change to the requested settings.

In one embodiment, both Phase 2 and Phase 3 have 24 ms timeouts. If either of these timeouts are reached, then equalization training for that Phase was not completed and the PCIe link will be returned to the previous slower speed (e.g. PCIe Gen1 or Gen2). In one exemplary embodiment, if either Phase 2 or Phase 3 timeout, the system can determine whether or not a determined data error rate is tolerable. If the error rate is not tolerable, then PCIe Gen 3 will not be used.

As discussed above, in addition to the timeout timers, there are predetermined timeouts, $T_{End}$, as illustrated in FIG. 2b, that are contingent upon the amount of allowable time that either of the training devices can tolerate. In other words, if one device can tolerate 50-100 µs with no traffic, while the other device can tolerate 2 ms with no traffic, then the predetermined timeout $T_{End}$ will be set to 50-100 µs. This predetermined timer will be started when traffic is suspended during equalization training. In one exemplary embodiment, the predetermined timeout value $T_{End}$ can be partially programmable. The predetermined timer can be made more aggressive or conservative so that the predetermined timer values can be adjusted in the future.

Exemplary Full Equalization Training and Burst Link Training Quanta:

Full Equalization Training:

In an exemplary embodiment three equalization training parameters used to configure transmitters of the rootport 102 and end point 104 are called precursor, maincursor and postcursor. These are communicated inside the training sets (TS1s) that each device sends to the other device when it wants that device to change its transmitter settings. In Phase 2, the endpoint 104 sends TS1s with these parameters embedded inside to direct the rootport 102 to change its transmitter settings, while in Phase 3, the rootport 102 sends TS1s with parameters to the endpoint 104 to tell it to change its transmitter settings.

In a hypothetical, exemplary embodiment, the rootport and endpoint starting coefficients are (a1, b1, c1) and (x1, y1, z1) respectively. In Phase 1, the rootport's 102 transmitter will use precursor=a1, maincursor=b1, and postcursor=c1. In Phase 0 and Phase 1, the endpoint's 104 transmitter will use precursor=x1, maincursor=y1, and the postcursor=z1. The rootport 102 and endpoint 104 may now enter Phase 2.

In this hypothetical example, each set of coefficients takes 10 µs to request and evaluate. The Endpoint 104 will request the rootport 102 to change its coefficients to (a2, b2, c2). The Rootport 102 will see this request and change its transmitter to (a2, b2, c2). Then, the Endpoint 104 will evaluate the quality of the signal on its receiver. The Endpoint 104 will determine that the current signal quality can be improved further. Based on a proprietary algorithm, it decides that it would like to evaluate coefficients (a3, b3, c3). The Endpoint 104 will now request (a3, b3, c3). The Rootport 102 will accept this request and set its transmitter to (a3, b3, c3). This process continues for 10 sets of coefficients. The final coefficients that are requested are (a11, b11, c11). In this hypothetical embodiment, the Endpoint 102 determines that (a11, b11, c11) are the best, so the Endpoint 102 exits Phase 2 and communicates this to the Rootport 102 by setting EC=11 in the TS1.

The Rootport 102 and Endpoint 104 now enter Phase 3. The Rootport 102 will also request several different coefficients one after another. For example, in one exemplary embodiment, it takes 20 attempts to find the best one. Therefore in this embodiment, the first set of coefficients will be (x2, y2, z2) and last coefficients will be (x21, y21, z21). In this hypothetical example, the Rootport 102 decides (x21, y21, z21) is the best one and exits Phase 3. The equalization training is now complete and the PCIe link can now operate at Gen3 speeds.

In the above exemplary embodiment, the total time taken in Phase 2 was 100 microseconds and the total time taken in Phase 3 was 200 microseconds. The grand total was 300 microseconds, with an additional 10 microseconds each for Phase 0 and Phase 1. Thus the total time the PCIe link was unavailable was 320 microseconds.

Burst Link Training Quanta:

In a further hypothetical example, Burst Link Training is utilized. Prior to requesting a speed change to PCIe Gen3, software will write the Burst Training Time Limit register on both the Rootport 102 and Endpoint 104 devices with a reasonable and safe value $T_{End}$. In one exemplary embodiment, this value $T_{End}$ is 100 microseconds. Software will also set the Burst Link Training Enable bit on both the Rootport 102 and the Endpoint 104 so that these two devices will use the Burst Link Training feature during PCIe Gen3 training.

A speed change is requested to Gen3, either from the Rootport 102 or the Endpoint 104. In Phase 0 and Phase 1, both devices behave exactly like in the earlier case. As in the previous hypothetical example, each set of coefficients takes 10 microseconds to request and evaluate. Since the Burst Training Time Limit is 100 microseconds, with 80 microseconds remaining upon entering Phase 2, the endpoint 104 will be able to request and evaluate (a2, b2, c2) through (a9, b9, c9), and consequently use up the remaining available time. After completing the evaluation of (a9, b9, c9), the Endpoint 104 will enter Phase 3. Since the time is up for this burst training quantum, the Rootport 102 won't do any evaluation in Phase 3. Instead the Rootport 102 will immediately exit upon entering Phase 3. Both the Rootport 102 and the Endpoint 104 will change their PCIe link speeds to PCIe Gen1 or Gen2. The link can now send traffic normally at Gen1/Gen2 speeds.

At the next available opportunity (such as an anticipated PCIe link idle time), another speed change to Gen3 is requested. Phase 0 and Phase 1 will work exactly as in the previous burst training quantum. In Phase 2, the Endpoint 104 will now request and evaluate parameters (a10, b10, c10) and (a11, b11, c11). In this hypothetical example, as in the previous example, the last set of parameters (a11, b11, c11) is determined to be the best setting. Therefore, 20 microseconds into phase 2, the Endpoint 104 will exit to Phase 3. The Endpoint 104 will also set the Burst Training Quantum Successful bit to 1 in the TS1 to indicate that it is done with evaluating coefficients.

Now, the Rootport 102 has 60 microseconds remaining of the original 80 microseconds for requesting and evaluating coefficients (after subtracting 20 microseconds to complete Phase 0 and Phase 1). So the Rootport 102 can test parameters (x2, y2, z2) to (x7, y7, z7) in Phase 3 for the remaining 60 microseconds. The Rootport 102 then exits Phase 3 because the time $T_{End}$ is up. Again, both the Rootport 102 and the Endpoint 104 will change their PCIe link speed back to Gen1 or Gen2. The PCIe link can once again send traffic normally at Gen1/Gen2 speeds.

At the next available opportunity (such as another anticipated link idle time), another speed change to Gen3 can be requested. The Phase 0 and Phase 1 will again work exactly as in the previous burst training quantum. In Phase 2, the Endpoint 104 will immediately exit to Phase 3. Now, the Rootport 102 has 80 microseconds remaining for requesting and evaluating coefficients. So it will test parameters (x8, y8, z8) to (x15, y15, z15). The Rootport 102 then exits Phase 3 because the time $T_{End}$ is again up. Both the Rootport 102 and Endpoint 104 will again change their PCIe link speed to Gen1 or Gen2. The PCIe link can once again send traffic normally at Gen1/Gen2 speeds.

At the next available opportunity (such as another anticipated link idle time), another speed change to Gen3 can be requested. Phase 0 and Phase 1 work exactly as in the previous burst training quantum. In Phase 2, the Endpoint 104 will immediately exit to Phase 3. Now, the Rootport 102 has 80 microseconds remaining for requesting and evaluating coefficients. So it will test parameters (x16, y16, z16) to (x20, y20, z20). In this hypothetical example, the Rootport 102 determines that the best setting is (x20, y20, z20). The Rootport 102 can now exit Phase 3 and set the Burst Quantum Successful bit and Burst Training Complete bit to 1 in the TS1. The PCIe link can now send traffic normally at Gen3 speeds.

In this case, the total time the PCIe link is down is 100+100+100+70=370 microseconds, but because each quantum is limited to 100 us, the link down time is only 100 us. This allows PCIe clients that have hard latency requirements requiring a transaction to complete in 100 microseconds to work without noticing the PCIe link down-time. The length of time that a device can tolerate no traffic is based in part on the level of traffic it is expected to receive. Because exemplary embodiments provide buffers 106, 108 on each device 102, 104 for queuing received traffic, even a busy interconnection link can tolerate at least a short interruption, such as the exemplary 100 μs as described in the embodiments above.

Figure 4:
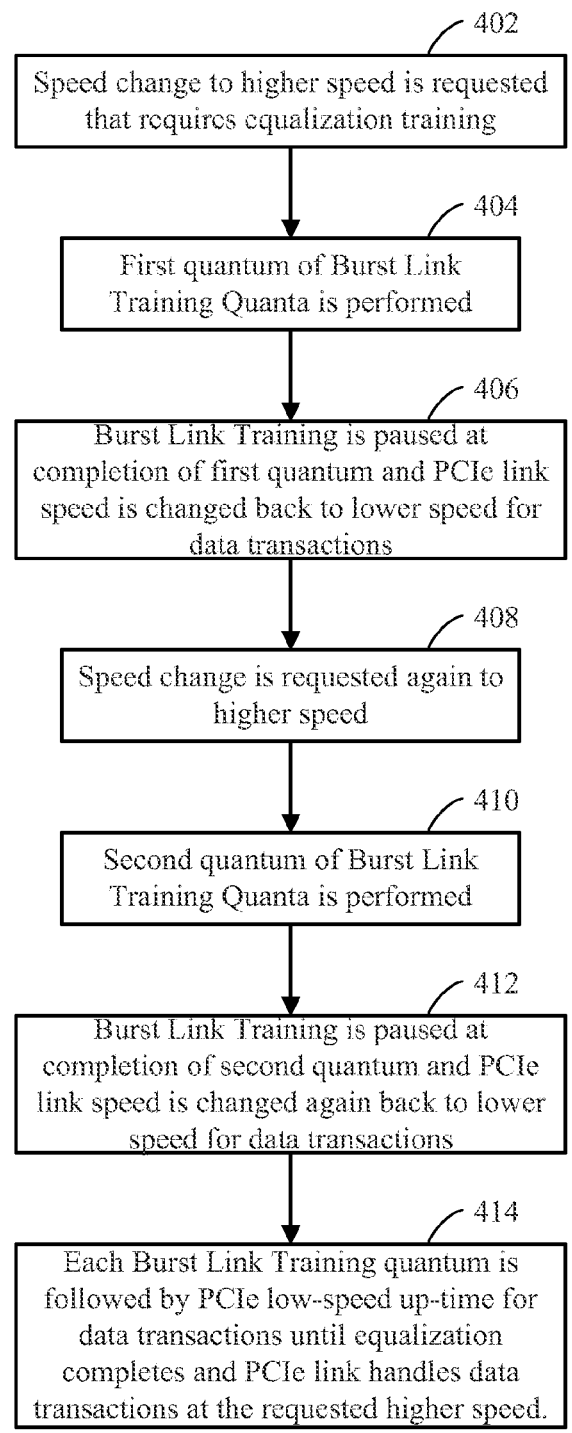
FIG. 4 illustrates an exemplary flow diagram, illustrating the steps to a method in accordance with an embodiment of the present invention.

FIG. 4 illustrates the steps in performing Burst Link Training Quanta. In step 402, either a rootport 102 or an endpoint 104 device requests a speed change from PCIe Gen1/Gen2 to higher speeds available at PCIe Gen3. In step 404, a first quantum of the Burst Link Training Quanta is performed. Before the first equalization training quantum is performed, the PCIe link speed is transitioned to the Gen3 speed, and parameters for the rootport 102 and endpoint 104 are selected and agree upon. A Burst Training Time Limit value $T_{End}$ is also selected. The selected value $T_{End}$ is the lesser of the time-out tolerances of the rootport 102 and endpoint 104. In another embodiment, the selected value $T_{End}$ may be adjusted depending on later time-out tolerance changes.

In step 406, the Burst Link Training is paused after the completion of the first Burst Link Training quantum. Once the Burst Training Time Limit $T_{End}$ has been reached, the currently running Burst Link Training quantum is finished and further equalization training is paused. The PCIe link speed is transitioned back down to Gen1/Gen2 speeds and data traffic can be transmitted and/or received by the rootport 102 and endpoint 104. In one embodiment, the waiting data traffic was queued in buffers 106, 108 of the rootport 102 and endpoint 104, respectively.

In step 408, a speed change to PCIe Gen3 is requested as an opportunity to continue the Burst Link Training begins. Such opportunities may correspond with anticipated PCIe link idle times. In step 410, a second quantum of the Burst Link Training Quanta is performed. Before the second equalization training quantum is performed, new parameter combination settings are selected based on the previous parameters settings and results from the first equalization training quantum, such that the second equalization training quantum begin at the point where the first equalization training quantum finished.

In step 412, the Burst Link Training is again paused after the completion of the second Burst Link Training quantum. Again, the PCIe link speed is transitioned back down to Gen1/Gen2 speeds and data traffic can again be transmitted and/or received by the rootport 102 and endpoint 104. In step 414, the cycle continues as each Burst Link Training quantum is followed by a low-speed up-time for the PCIe link to handle data traffic, thereby preventing or reducing PCIe link down-time issues until the equalization training completes and the PCIe link can handle data traffic at PCIe Gen3 speeds.

In further exemplary embodiments, there are many ways to perform the testing and evaluation of a received signal. For example, the endpoint 104 and rootport 102 devices could cycle through all of a selected quantity of possible parameter combinations that they desire to compare, evaluate all of the results, and select the optimal parameter setting. In one embodiment, there can be more than a hundred different parameter setting combinations. In various embodiments, equalization training can go through each of these parameter setting combinations individually or use algorithms for selecting which set of parameters to use. Exemplary embodiments can work with a host of different algorithms for selecting a preferred selection of parameters to test. Further, if the system is very challenging, the parameter search may be longer and require a deeper search through the available settings. In one embodiment, there may be a situation where no one set of parameters is optimal. Various sets of parameters can therefore be evaluated to select the most optimal set.

Figure 5:
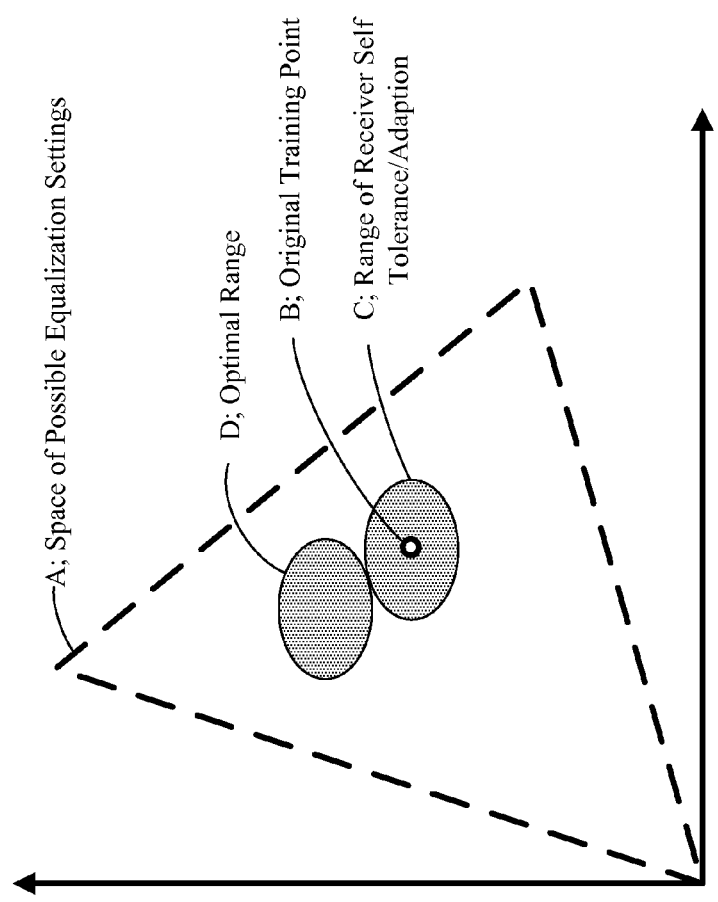
FIG. 5 is an exemplary two-dimensional plot illustrating a location of an original training point as well as range of optimal values in a larger space of available equalization parameter settings, in accordance with an embodiment of the present invention.
Figure 6:
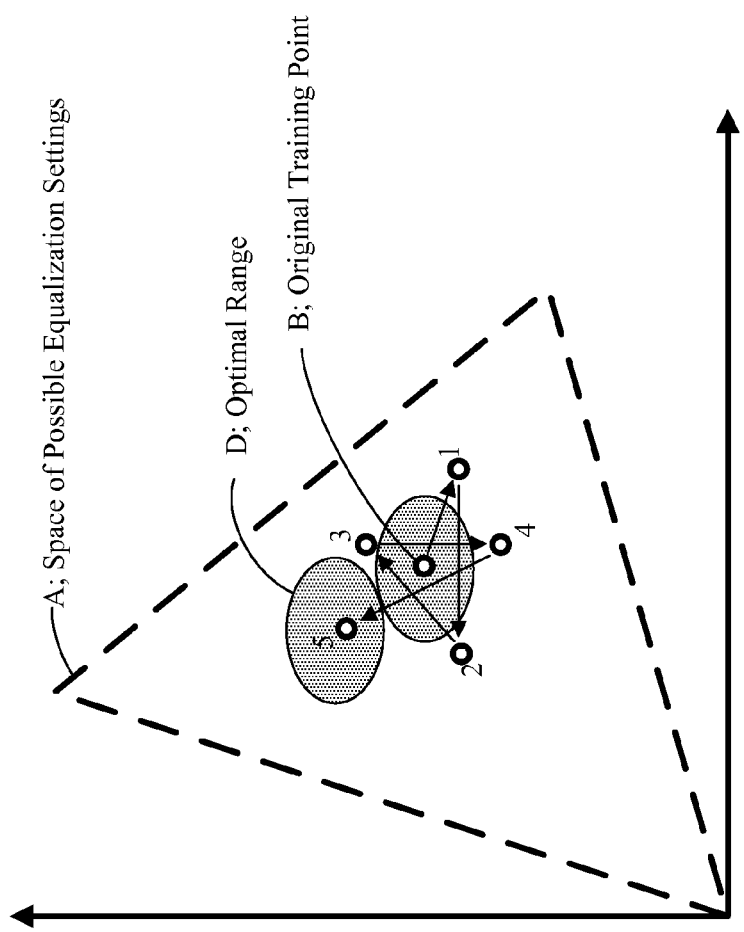
FIG. 6 is an exemplary two-dimensional plot illustrating a method for determining an optimal location from an original training point starting location as well as a range of optimal values in a larger space of available equalization parameter settings, in accordance with an embodiment of the present invention.
Figure 7:
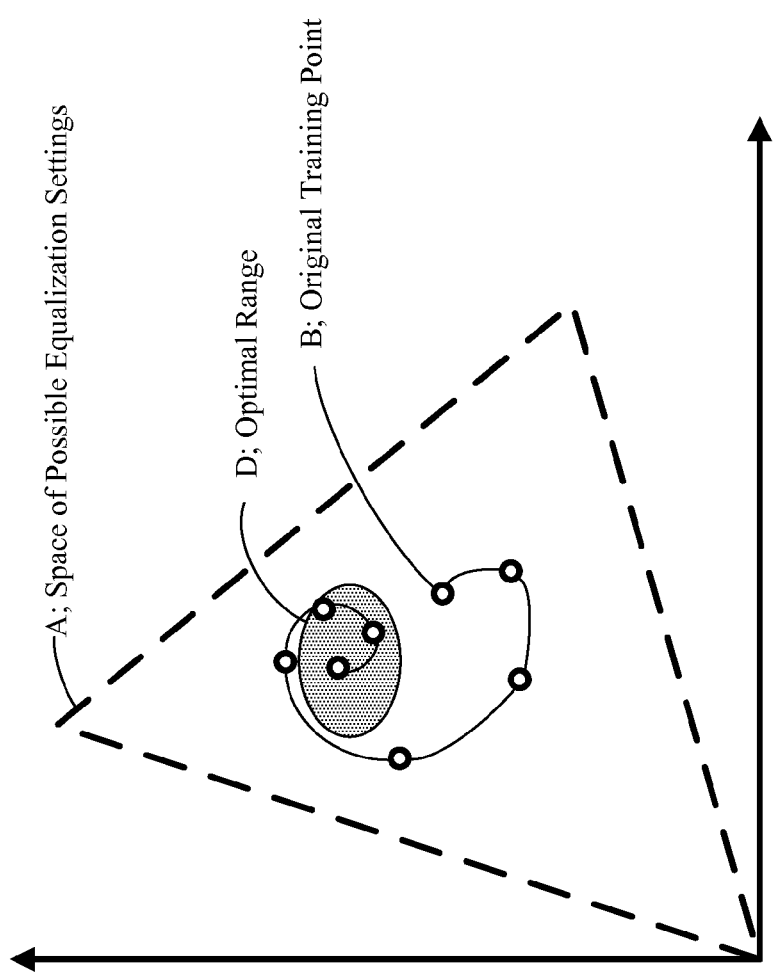
FIG. 7 is an exemplary two-dimensional plot illustrating a method for determining an optimal location from an original training point starting location as well as a range of optimal values in a larger space of available equalization parameter settings, in accordance with an embodiment of the present invention.

As illustrated in FIGS. 5-7, the space of possible equalization settings can be represented in a two-dimensional graph, with the enclosed area A representing all possible equalization setting combinations. Point B represents an original starting point, or an existing set of parameters that equalization training begins with. Area C represents a range of receiver self tolerance and adaptation, where if the optimal parameter combination shifts from the original point B, but remains within area C, further equalization training may not be required. However, as illustrated in FIG. 5, if the optimal set of parameter combinations is found in area D, then equalization training may be required to find a parameter combination that lands into the area of optimal range D.

In various embodiments, program algorithms determine the link training parameter combinations attempted in each Burst Link Training quantum. The selection of these parameters is based on a knowledge of parameters that have worked in the past and by comparing quality metrics derived from each set of equalization parameters. Therefore, parameter combinations can be chosen that follow along a divergent path to "home-in" on the best parameters. In each step, software can reprogram the state machine with the next set of parameters to try for each attempt.

In one embodiment, equalization training can be performed whenever the PCIe link is idle, thus supporting continuous probing of other equalization settings, and compensating for any drift in electrical characteristics, to ensure the PCIe link remains at optimal performance throughput and minimal BER. In another embodiment, this equalization training process may be repeated so long as the BER or other PCIe link quality indicators are above a pre-programmed threshold, and the process may stop once the PCIe link quality is better than another threshold.

In one embodiment, as illustrated in FIG. 6, software algorithms attempt changes in equalization parameters large enough to exceed the receiver's natural adaptation, in diagonal opposing directions (to ensure each test lands in an area outside the receivers native adaption range and yet overlapping adjacent ranges). The algorithms collect quality metrics to discern whether the center of the receiver operating point can be shifted slightly to compensate for PCIe link changes, allowing the PCIe link operating point to wander dynamically as the PCIe link characteristics change.

In another embodiment, FIG. 7 illustrates how the Link Training and Status State Machine may wander the space of known parameters, measuring the quality of each attempt, weighing it against previous attempts, and adjusting the adjustment direction to iteratively zero-in on the ideal parameters, based on a "drunken walking" pattern. While the equalization training process continues, in one embodiment, the Link Training and Status State Machine can remember that the training is not complete, the last parameters used and the path of testing, and thus re-attempt another set of parameters in the same approach on each subsequent burst.

In one embodiment when the Burst Link Training is initiated, the process can be signaled as a normal request to transition to the faster PCIe link speed, with a subsequent PCIe link training request (for example, sending the TS1 sequences), but can differentiate between a normal full-link training and Burst Link Training with its early completion and exit from the training process, through the use of reserved bit combinations to indicate that the training is not done, and will be re-attempted, and that the link is not ready to operate at the higher speed.

In one embodiment flags or bits in the capability registers of the downstream endpoint 104 device may be used to indicate the desire to operate in Burst Link Training mode. In another embodiment the operating state of the system may be used to allow software to decide or request the use of one form of training versus another. In one embodiment, if equalization training is executed during a System BIOS Power-on Self Test (SBIOS POST), then either a normal full or burst link training can be used. In a further embodiment, if equalization training is executed by the rootport 102 or endpoint 104 drivers, then burst link training can be used. In another embodiment, if the operating system has registered taking over the system control from SBIOS, then burst link training can be used.

Burst link training can also be requested after the PCIe link has completed the equalization coefficient search and has been running normally at PCIe Gen3 speeds for some time. If there are changes in environmental factors that introduce bit errors on the PCIe link, it can be advisable to search for a better set of coefficients than the set that is currently being used. In this case, as discussed above, either the rootport 102 or the endpoint 104 can request an entry into an equalization training cycle. If the equalization training state is entered from PCI Gen3 as described here, the Burst Link Training Quantum Successful and Burst Link Training Complete bits can be reset to 0, with the Burst Link Training Complete bit reset to 0b in the TS1 and the rootport 102 and endpoint 104 should automatically request a speed reduction after each quantum of the burst link training quanta has completed. In one exemplary embodiment, it is assumed that the reason a new burst link training cycle was started was because the PCIe link was unstable in PCIe Gen3. Therefore, the PCIe link will resume operation at Gen3 speeds only after a new optimal set of parameter coefficients have been found.

It is also noted that burst link training methods do not prevent the PCIe link from performing conventional autonomous equalization training at an initial boot time. If both the rootport 102 and endpoint 104 advertise Gen3 support, then in one exemplary embodiment, the downstream endpoint 104 initiates a Gen3 speed change autonomously following the end of a Conventional Reset, and performs a full Recovery Equalization procedure (equalization training) If this training window was insufficient to find the optimal parameter coefficients, Burst Link Training Quanta can be requested at a later time. If for example, the rootport 102 does not advertise Gen3 support at the initial boot time (but advertises such support at a later time), then the autonomous speed change to PCIe Gen3 speed and full equalization training cannot be performed at the initial boot time. In this way, the system software is expected to enable Burst Link Training mode on both the rootport 102 and endpoint 104 prior to requesting a speed change to PCI Gen3 for the first time.

In one embodiment, the Completion Timeout Value specified in the Device Control register is prolonged by the timeout specified in the Burst Training Time Limit register, just before entering a Burst Link Training quantum. This will allow the upper software layers to properly account for the time when the PCIe link is unavailable for sending traffic while in the middle of a Burst Training quantum.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A system comprising:
    a first device and a second device;
    a communications link; and
    a memory, wherein the memory stores instructions that when executed by the system perform a method of communications link training, the method comprising:
        requesting a speed change to a second speed for the first device communicating with the second device at a first speed via the communications link;
        performing a first training cycle for the first device and the second device at the second speed;
        pausing the first training cycle before the first training cycle completes;
        communicating data between the first device and the second device at the first speed for a period of time; and
        continuing the first training cycle for the first device and the second device at the second speed, wherein the first training cycle at the second speed continues at a point where the first training cycle paused.

2. The system of claim 1, wherein the pausing the first training cycle takes place after a selected period of time.

3. The system of claim 2, wherein the selected period of time is a lowest idle time of idle times permitted by the first device and the second device.

4. The system of claim 1, wherein the data to be communicated between the first device and second device is stored in a buffer of one of the first and second devices during the first training cycle for the second speed.

5. The system of claim 1, wherein the method of communications link training further comprises:
performing a second training cycle for the first device and second device at the second speed, wherein the second training cycle is performed after the first training cycle has completed and the first device and second device have communicated data at the second speed.

6. The system of claim 5, wherein the performing the second training cycle is performed when an error rate of the first device and second device communicating at the second speed is above a threshold.

7. The system of claim 1, wherein a training cycle comprises:
selecting a plurality of parameters for a transmitter of the first device and a receiver of the second device; and
selecting a plurality of parameters for a transmitter of the second device and a receiver of the first device.

8. The system of claim 7, wherein the pluralities of parameters selected are optimal parameters for the first device and the second device as determined by at least one parameter selection and evaluation process.

9. A communications link training method comprising:
requesting a speed change to a second speed for a first device communicating with a second device at a first speed via the communications link;
performing a first training cycle for the first device and the second device at the second speed;
pausing the first training cycle before the first training cycle completes;
communicating data between the first device and the second device at the first speed for a period of time; and
continuing the first training cycle for the first device and the second device at the second speed, wherein the first training cycle at the second speed continues at a point where the first training cycle paused.

10. The communications link training method of claim 9, wherein pausing the first training cycle takes place after a selected period of time.

11. The communications link training method of claim 10, wherein the selected period of time is a lowest idle time of idle times permitted by the first device and the second device.

12. The communications link training method of claim 9, wherein data to be communicated between the first device and second device is stored in a buffer of one of the first and second devices during the first training cycle for the second speed.

13. The communications link training method of claim 9 further comprising:
performing a second training cycle for the first device and second device at the second speed, wherein the second training cycle is performed after the first training cycle has completed and the first device and second device have communicated data at the second speed.

14. The communications link training method of claim 13, wherein performing the second training cycle is performed when an error rate of the first device and second device communicating at the second speed is above a threshold.

15. The communications link training method of claim 9, wherein a training cycle comprises:
selecting a plurality of parameters for a transmitter of the first device and a receiver of the second device; and
selecting a plurality of parameters for a transmitter of the second device and a receiver of the first device.

16. A non-transitory computer readable storage medium comprising computer-executable instructions stored therein, the computer-executable instructions comprising:
instructions to request a speed change to a second speed for a first device communicating with a second device at a first speed via a communications link;
instructions to perform a first training cycle for the first device and the second device at the second speed;
instructions to pause the first training cycle before the first training cycle completes;
instructions to communicate data between the first device and the second device at the first speed for a period of time; and
instructions to continue the first training cycle for the first device and the second device at the second speed, wherein the first training cycle at the second speed continues at a point where the first training cycle paused.

17. The non-transitory computer readable storage medium of claim 16, wherein pausing the first training cycle takes place after a selected period of time, and wherein the selected period of time is a lowest idle time of idle times permitted by the first device and the second device.

18. The non-transitory computer readable storage medium of claim 16, wherein the computer-executable instructions further comprise:
instructions to perform a second training cycle for the first device and second device at the second speed, wherein the second training cycle is performed after the first training cycle has completed and the first device and second device have communicated data at the second speed.

19. The non-transitory computer readable storage medium of claim 18, wherein performing the second training cycle is performed when an error rate of the first device and second device communicating at the second speed is above a threshold.

20. The non-transitory computer readable storage medium of claim 16, wherein a training cycle comprises:
instructions to select a plurality of parameters for a transmitter of the first device and a receiver of the second device; and
instructions to select a plurality of parameters for a transmitter of the second device and a receiver of the first device.

* * * * *